United States Patent [19]
Jones

[11] Patent Number: 6,154,872
[45] Date of Patent: Nov. 28, 2000

[54] METHOD, CIRCUIT AND APPARATUS FOR PRESERVING AND/OR CORRECTING PRODUCT ENGINEERING INFORMATION

[75] Inventor: Christopher W. Jones, Pleasanton, Calif.

[73] Assignee: Cypress Semiconductor Corporation, San Jose, Calif.

[21] Appl. No.: 08/975,343

[22] Filed: Nov. 20, 1997

[51] Int. Cl.$^7$ .................................................. G06F 11/08
[52] U.S. Cl. ........................................... 714/797; 714/805
[58] Field of Search .................................... 714/820, 755, 714/6; 360/53, 47; 29/407.05; 700/121

[56] References Cited

U.S. PATENT DOCUMENTS

| | | | |
|---|---|---|---|
| 4,510,673 | 4/1985 | Shils et al. ................................. | 29/574 |
| 4,547,882 | 10/1985 | Tanner ....................................... | 714/755 |
| 4,772,963 | 9/1988 | Van Lahr et al. ......................... | 360/47 |
| 4,931,997 | 6/1990 | Mitsuishi et al. ......................... | 365/218 |
| 4,953,277 | 9/1990 | Crispin et al. ......................... | 29/407.05 |
| 5,084,843 | 1/1992 | Mitsuishi et al. ......................... | 365/218 |
| 5,126,889 | 6/1992 | Walden ..................................... | 360/53 |
| 5,256,578 | 10/1993 | Corley et al. ............................. | 438/17 |
| 5,360,747 | 11/1994 | Larson et al. ............................. | 438/10 |
| 5,406,566 | 4/1995 | Obara ....................................... | 714/719 |
| 5,450,426 | 9/1995 | Purdham ................................... | 714/820 |
| 5,457,408 | 10/1995 | Leung ....................................... | 326/38 |
| 5,627,838 | 5/1997 | Lin et al. ................................... | 714/718 |
| 5,642,307 | 6/1997 | Jernigan ................................... | 365/103 |
| 5,664,093 | 9/1997 | Barnett et al. ............................ | 714/31 |
| 5,725,559 | 3/1998 | Alt et al. ................................... | 607/5 |
| 5,818,848 | 10/1998 | Lin et al. .................................. | 714/718 |
| 5,867,714 | 2/1999 | Todd et al. ............................... | 395/712 |
| 5,892,683 | 4/1999 | Sung ....................................... | 395/500.48 |
| 5,905,887 | 5/1999 | Wu et al. ................................. | 713/500 |
| 5,907,671 | 5/1999 | Chen et al. ............................... | 714/6 |
| 5,917,833 | 6/1999 | Sato ........................................ | 365/201 |
| 6,018,686 | 1/2000 | Orso et al. ............................... | 700/121 |

OTHER PUBLICATIONS

U.S. application Ser. No. 08/984,722.
U.S. application Ser. No. 08/984,814.
U.S. application Ser. No. 08/962,519.

*Primary Examiner*—Albert De Cady
*Assistant Examiner*—David Ton
*Attorney, Agent, or Firm*—Kevin L. Daffer; Conley, Rose & Tayon

[57] ABSTRACT

A method, circuit and apparatus is provided for preserving and/or correcting product engineering information. Non-volatile storage devices reserved for receiving product engineering bits can either be contained in at least three separate storage locations spaced from each other across the integrated circuit or, alternatively, be contained in a single storage location area with error correction bits and/or words added to that location. In the first instance, redundant product engineering bits are written to each storage location. Product engineering bits read from a majority of those locations which have identical values are deemed valid. The addition of extra bits and/or words can be combined with the possibly defective product engineering bits to correct errors in those bits. Using redundancy to correct errors caused by charge loss or charge gain within previously stored product engineering values proves a beneficial outcome since testing the product engineering bit locations is not necessarily a viable solution. The product engineering bit locations may be programmed well before test patterns can be written to and read from those locations. Further, the uniquely programmed product engineering bits may unduly be lost during normal assembly of die into an integrated circuit package.

16 Claims, 4 Drawing Sheets

METHOD, CIRCUIT AND APPARATUS FOR PRESERVING AND/OR CORRECTING PRODUCT ENGINEERING INFORMATION

BACKGROUND OF THE INVENTION

1. Field of the Invention

This invention relates to integrated circuit manufacture and, more particularly, to a method, circuit and apparatus for electrically writing indicia upon and reading indicia from an integrated circuit ("die") during production, test or programming of the die. The indicia is placed so that erroneous indicia can be ignored or corrected, so that the indicia remains highly reliable as to a die which it uniquely identifies from among numerous, similarly manufactured and configured die according to how, when and where the die was manufactured, tested or programmed, etc.

2. Description of the Related Art

An integrated circuit is often referred to as a die or chip. Those terms are henceforth interchangeably used. A die may contain several thousand active and passive devices, formed on a monolithic substrate. Those devices can be interconnected to form an overall circuit. Active devices include transistors, whereas passive devices include resistors and capacitors, for example.

Active and passive devices can be coupled to form one or more memory elements arranged across a die. A popular memory device is one which can be electrically programmed after the die is manufactured. However, once the storage elements are programmed, they are preferably non-volatile. Present non-volatile storage elements include, for example, programmable read only memory (PROM), fuses and/or anti-fuses, etc. Examples of popular PROMs include EPROMs, EEPROMs or flash EPROMs.

A problem common to non-volatile storage elements is their tendency to lose or gain charge after they are programmed or erased. Thus, a programmed element may lose its programmed state or a non-programmed element may gain program status. Charge loss or gain may occur when the die is stressed either through electrical interactions or heat cycles applied thereto.

Methods used to test charge loss or gain involve programming a pattern into the array of storage elements, stressing the die and thereafter reading bits within the array. If the location of read bits corresponds to the programmed locations, then charge loss or gain appears not to have occurred, at least for the bits associated with that test pattern.

In most instances, a manufacturer will test the non-volatile storage elements while the die is associated with a wafer. The manufacturer may perform more extensive tests after the previously tested (i.e., "probed"), viable die are packaged. Both the probe test and the packaged die test can be performed at numerous temperatures, and the storage elements can be programmed with multiple patterns to check for charge gain or loss. However, testing the storage elements implies that those elements can be programmed and re-programmed in multiple ways. A problem exists if a portion of the storage elements can only be programmed with a unique bit pattern existing prior to the probe test. If a pattern is applied to the previously programmed bits, the uniqueness of those bits will be lost.

It would be desirable to utilize a set of storage locations which receive information unique to the die on which they are programmed. Attributing information as to the manufacture, test, and programmability of a die into that set of storage devices would be beneficial in tracing performance history to the parameters by which that die was produced, tested, and programmed. The desirous technique of electrically programming non-volatile storage elements of each and every die with a unique bit pattern would prove valuable to an integrated circuit manufacturer who desires traceability of a die to how that die was manufactured, when it was manufactured, how it was tested, results from those tests, testers used, where the die was drawn from a wafer, from a wafer lot, how the die was processed, processing equipment used, programming equipment used, the method/equipment used, etc.

SUMMARY OF THE INVENTION

The problems outlined above are in large part solved by an electrically programmable integrated circuit, die or chip. By design, the present die is programmed solely by the manufacturer, or by an end user given instructions by the manufacturer. A unique set of product engineering ("PE") bits is programmed by the manufacturer into storage elements within an address space which the customer or end user will not access during normal operation of the die.

The address space reserved for the PE bits is designed to access one or more storage locations embodied within the die. Each storage location comprises non-volatile storage elements, which, when programmed, hopefully maintain their programmed value. Viability of the programmed storage locations reserved for PE bits cannot be tested since the PE bits can be written prior to the probe test—i.e., the PE bits may be programmed as early as wafer engineering test immediately subsequent to wafer manufacture. If charge loss or charge gain is encountered in programmed storage elements containing the uniquely programmed PE bits, then redundancy and/or error correction appears as a better alternative than applying a test pattern.

According to a first embodiment, product engineering bits are programmed or written to at least three storage locations spaced from each other across the die. The PE bits are identically placed in each storage location by accessing the reserved address space which will not be accessed during normal operation of the integrated circuit. If the PE bits subsequently read from each storage location are dissimilar, the correct or valid set of PE bits is determined by comparing each and every bit across respective storage locations. If a set of PE bits within one location is read identical to PE bits in another location, then it is determined those PE bits are the originally stored PE bit values provided, of course, that two storage locations represent a majority of locations reserved for the PE bits.

Adding redundant storage locations spaced distances from each other across the die ensures that if manufacturing defects are localized in one area, defects in that area will adversely affect only one storage location—i.e., only a minority of storage locations. The number of storage locations chosen is at least three so that a comparison of PE bits read from those locations will yield a majority concurrence. It is recognized, however, that more than three storage locations may be used if it is determined that die fabrication might consistently produce two defective storage locations. In that instance, four or more storage locations may be formed across the die. More preferably, an odd number of storage locations, beginning with three and incrementing by two is desired.

According to another embodiment, rather than adding redundant storage locations, additional bits and/or words can be added to a single storage location to essentially achieve the same result while utilizing less silicon surface area. In this embodiment, programming additional bits and reading those bits along with the PE bits allows detection of errors in the PE bits. If a sufficient number of extra bits are added, correction of defective PE bit errors is achieved. The additional bits can be considered parity bits, checksum bits or hamming-coded bits, generally recognized for their error detection/correction capabilities.

The benefit of adding redundant storage locations or error detection/correction bits proves beneficial in ensuring uniquely programmed PE bits remain as such. The PE bits and, more specifically, the storage locations which receive the PE bits can therefore be programmed early in the manufacturing cycle, and the unique values of the programmed PE bits (regardless of their validity) remain throughout the time in which test patterns are introduced into the storage locations exclusive of those which contain the PE bits. Testing the PE bit storage location when the normal memory array is tested would, unfortunately, wipe out manufacturing or previous test information stored therein. Accordingly, it is imperative that the present redundancy mechanism be used, and that redundancy be applied throughout the various stages of integrated circuit manufacture, tests and circuit program concurrent with accessing the reserve storage locations and writing PE bits to those locations.

Broadly speaking, the present invention concerns an integrated circuit. The integrated circuit comprises at least three non-volatile storage locations spaced from each other across the integrated circuit. Each of the storage locations is adapted to receive information unique to tracing the integrated circuit to a plurality of parameters used in manufacturing and testing the integrated circuit. Each of the storage locations may be addressed by a separate address contained within a first address space. The first address space is inaccessible during operation of the integrated circuit. The information received by each of the storage locations is duplicative to achieve redundancy across those locations. When information read from a majority of those storage locations is identical, that information is deemed "valid" and declared to be the originally stored PE bit values.

The information contained in the PE bits can be programmed into the storage locations during manufacture of the integrated circuit, during tests of the integrated circuit, or during in-field programming of a memory array contained within the integrated circuit bearing the PE bits. Similarly, the previously programmed information can thereafter be read during testing of the integrated circuit by the manufacturer, either before or after the die is packaged or possibly by the customer or manufacturer after the packaged die is shipped to an end user.

The present invention further concerns a storage location formed upon an integrated circuit. The storage location comprises a first set of bit locations adapted to store information (i.e., PE bits) used to manufacture and test the integrated circuit. A second set of bit locations are adapted to store a plurality of bits (i.e., parity, checksum or hamming-coded bits) sufficient to detect corrupted said first set of bit locations. The second set of bit locations is adapted to detect and correct digital values read from the first set of bit locations.

The present invention yet further concerns a method for attributing parameters used to manufacture and test an integrated circuit to that integrated circuit. The method includes programming identical parameters unique to the integrated circuit (or die) into each of at least three storage locations separated from each other and embodied within the integrated circuit. Parameters from each of the storage locations can then be read at a time subsequent to when the parameters were programmed. The read parameters may then be compared and declared as valid if a match occurs between parameters read from at least two of those storage locations.

Yet further, an alternative method may be provided for programming the first set of bit locations with digital representations (i.e., PE bits) of the parameters while programming a second set of bit locations with error correction, parity, checksum or hamming-coded bits. Subsequent to programming the first and second bit locations, the programmed parameters and error correction bits may then be read. The error correction bits are sufficient in number to detect and correct erroneous program parameters corrupted during programming or subsequent reading of those parameters.

BRIEF DESCRIPTION OF THE DRAWINGS

Other objects and advantages of the invention will become apparent upon reading the following detailed description and upon reference to the accompanying drawings in which.

While the invention may be modified and have alternative forms, specific embodiments thereof are shown by way of example in the drawings and will herein be described in detail. It should be understood, however, that the drawings and detailed description thereto are not intended to limit the invention to the particular form disclosed but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
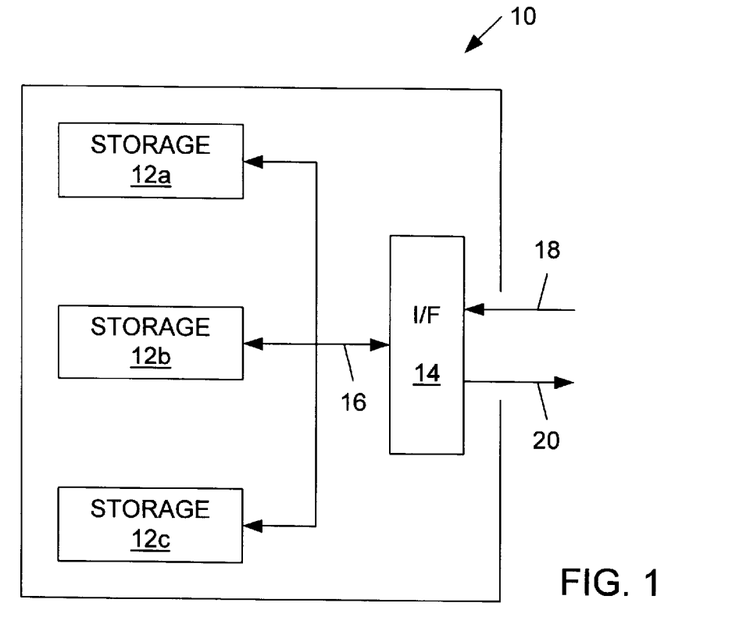
FIG. 1 is a plan view of a die having separate storage locations arranged across the die for receiving redundant product engineering bits according to one embodiment.

Turning now to the drawings, FIG. 1 is a plan view of an integrated circuit 10 embodying at least three storage locations 12, according to one embodiment. Each storage location 12 includes a series of non-volatile storage elements. Each storage element is adapted to receive PE bits. Therefore, each storage element is deemed a bit location dedicated for use by a product engineer of an entity which manufactures integrated circuit 10.

Each storage location 12 is connected to an interface unit 14 by an address/data/control bus 16. Interface unit 14 receives PE bits indicative of unique manufacturing and test information specific to integrated circuit 10. The PE bits are applied by first addressing a location reserved for those bits and then applying those bits in a subsequent data cycle. Address, data and control information can be applied either serially or in parallel within the conductor or bus labeled as reference numeral 18.

Accessing an address location which is to contain PE bits, followed by programming PE bit values to that location is deemed a programming cycle. Programming can occur, e.g., during manufacture or tests of integrated circuit 10. Once programmed, the data can be read in a subsequent operation by addressing and controlling the PE bit locations via address/control bus 18 and reading the value of the PE bit locations via bus 20. Interface unit 14 includes any and all logic needed to decode an address, place data on that address, and recognize programmed data read from various addressed locations.

Each storage location 12 contains at least one row or column of non-volatile memory addressable from a word line. The word lines correspond to address lines arising from interface unit 14. Once a series of storage elements or PE bit locations is addressed, then a particular bit within the addressed word can be written to or read from via a decoder within interface unit 14. Bus 18 may comprise a data bus separate from an address bus, or a shared (multiplexed) data and addressed bus.

Integrated circuit 10 includes any circuit having active and passive devices. Included with those devices are storage locations reserved for receiving PE bits hereof. The number of bit lines and word lines will vary depending on the amount of manufacturing and testing indicia needed to be stored. For example, storage locations 12 can be of pre-defined size at manufacture, yet a variable portion of storage location 12 may be used depending on the amount of information needed to be stored.

According to a preferred example, each storage location 12a, 12b and 12c can be addressed at the same address location or at different addresses. Each storage location, however, receives identical programmed data so that the PE bits placed in storage location 12a is redundant to those placed in locations 12d and 12c. Storage locations 12a, 12b and 12c are spaced from each other across integrated circuit 10. If a localized region of integrated circuit 10 is defective, possibly due to mis-manufacturing, then only one storage location will be corrupted. Readings taken from the other two storage locations will correspond with each other and will be accepted as valid PE bit data. The corrupted storage location, and readings taken therefrom, will then be discarded.

It is recognized that more than three storage locations 12 may be employed if additional redundancy and safeguards against mis-processing is desired. For example, five storage locations 12 would yield valid data if two storage locations were corrupted. That is, a three-location majority of the five storage locations 12 would produce valid data if readings taken from those three locations were identical.

The concept of interspersing, interleaving, or scattering storage locations across the silicon media provides significant protection against defective features formed in silicon regions localized in the regions of a minority of storage locations. For example, if the failure rate of an integrated circuit is 1 in 1,000, the chances of two out of three memory locations being incorrect when read is 1 in 1,000,000. If, for example, there are 104 PE bits to be stored, then the probability that 1 of the 104 determined values is incorrect is 104 in 1,000,000, or 104 ppm. If the failure rate of the integrated circuit, and more specifically, memory cells formed in that circuit, is improved to 1 in 10,000, the probability of failure will decrease to 104 in 100,000,000, or 1.04 ppm.

The disadvantage of employing at least three storage locations 12, and preferably an odd number of storage locations 12, is that at least three times as many PE bit locations are required. In the example in which 104 PE bits are used, a minimum of 312 PE bit locations would be needed. If silicon space is limited, a more enlightened approach for error detection and correction is required.

Figure 2:
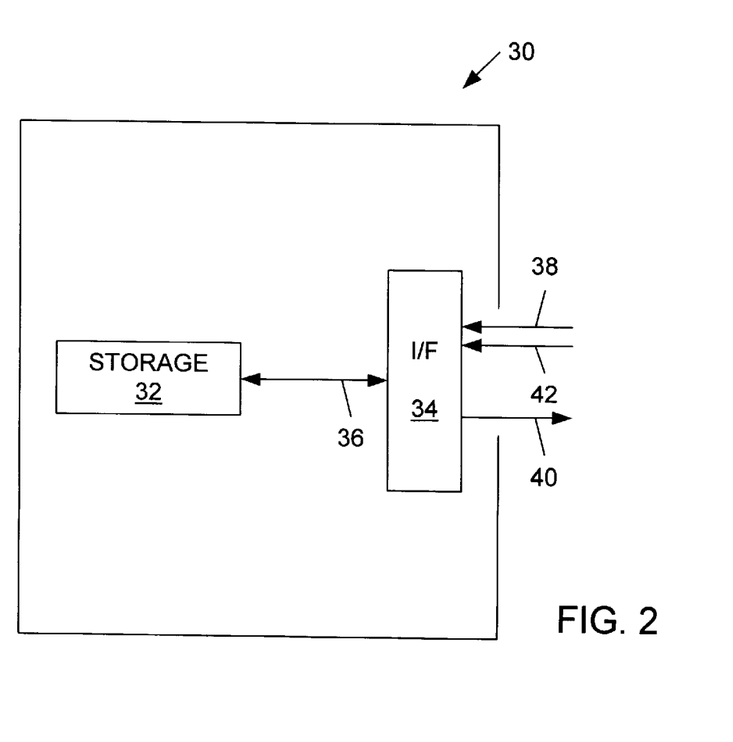
FIG. 2 is a plan view of a die having a single storage location containing parity, hamming or check sum bits used to detect and correct erroneous product engineering bits read from the die.

Illustrated in FIG. 2 is an integrated circuit 30, according to an exemplary embodiment, employing a single storage location 32. Similar to that shown in FIG. 1, storage location 32 is connected to an interface unit 34 by an address/data/control bus 36. Data is written to location 32 and read from location 32 once proper locations are addressed. The address locations, subsequent data and control are presented to interface unit 34 via a serial link or parallel link 38. The data read from storage location 32 can be dispatched from interface unit 34 by another serial or data link 40. The addressed word on link 38 may contain additional parity, checksum or hamming-coded bits henceforth referred to more generally as error correction bits. Alternatively, an additional word may be addressed, as shown by numeral 42, to allow redundant writing of two or more words to storage location 32. The redundant words can thereafter be addressed and read via link 40. A comparison among multiple error correction bits within a single word or error correction bits among several words will prove beneficial in detecting as well as correcting erroneous PE bits read from storage location 32, as will be described below in reference to FIG. 4.

Figure 3:
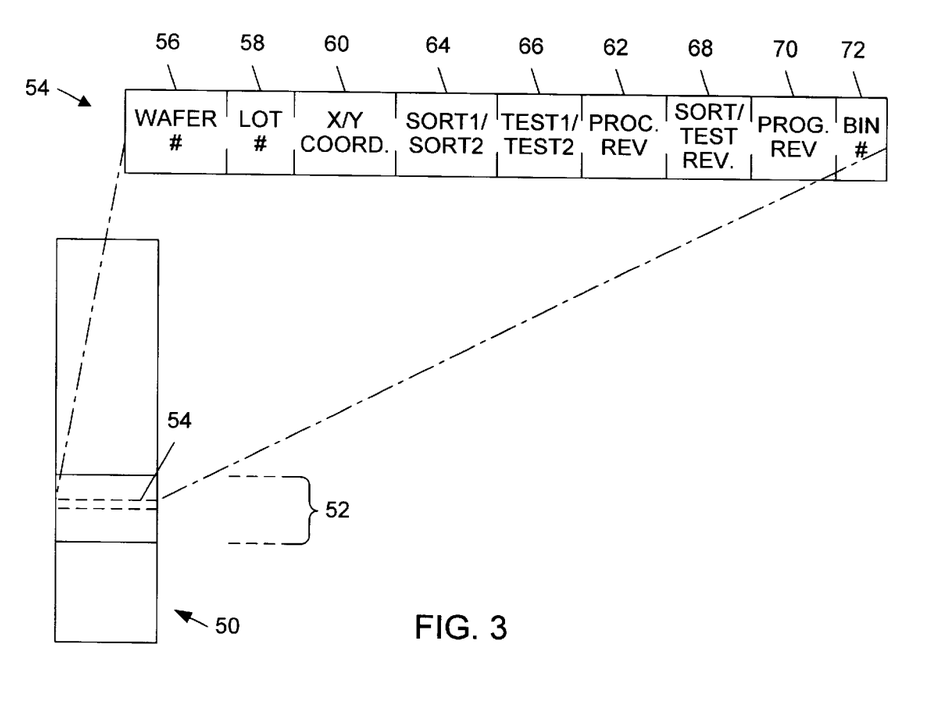
FIG. 3 is a plan view of a memory address space embodying an address location reserved for receiving the product engineering bits, used to identify various manufacturing and test information unique to each die within a wafer, among wafers within a lot, and among wafer lots.

Some of the manufacturing and test information which can be stored as PE bits within multiple storage locations 12, or within a single storage location 32, is shown in FIG. 3. According to one embodiment, an address decoder used to address the entire programmable storage locations of the integrated circuit can accommodate an address space 50. A majority of address space 50 is used to program operation of the integrated circuit, or other integrated circuits operably linked thereto. However, a subset 52 of address space 50 is reserved for receiving the PE bits. Subset 52 can be found as possibly a contiguous space or bifurcated into multiple address locations within address space 50. Subset address space 52 can be of fixed size for a particular integrated circuit post-manufacture, or can be variable in size depending on the number of address locations desired. For example, at least one address location 54 within space 52 may be used to uniquely identify a die particular to data stored at location 54. For example, identifying information attributed to that integrated circuit or die includes, e.g., a wafer number 56 of a lot number 58 from which the die was extracted. It may also be beneficial to note the position upon the wafer which contains the extracted die. Thus, the electrically viable die may be drawn from a particular location denoted according to an x coordinate and a y coordinate 60. The x and y coordinates may comprise a grid drawn across the wafer. If a majority of the die lies within a particular grid x and y coordinate, then that die is identified with PE bits indicating that particular x/y coordinate. The benefit of mapping a die to a location upon a wafer will provide insights as to possibly why that die performs as it does relative to other die extracted at other locations from that wafer.

In addition to providing information as to the whereabouts of a die, the particular processing "recipe" used to produce the die can also be recorded with bits reserved for space 62. For example, a processing flow may undergo numerous revisions, yet the particular revision used to produce a unique die can be recorded on that die.

Along with processing or manufacturing indicia, test information can also be provided. A typical die may be tested (i.e., probed) at multiple temperatures, possibly at cold temperature, room temperature and hot temperature. Alternatively, die can be tested at room temperature, followed by application of a temperature cycle to the die, then again tested at room temperature. Regardless the test or temperature sequence, testing the die is what is often referred to as "SORT". Sort testing is used to determine inoperable die from electrically viable die, wherein the inoperable die are marked and discarded from the assembly operation. Sorting at various stages and/or temperatures is denoted as, e.g., SORT 1 and SORT 2, shown as reference numeral 64.

After the viable die are packaged during the assembly operation, testing is resumed on the packaged product. The test may be the same as, or more extensive than, that used during SORT. Testing can occur at varying temperatures or can be separated by a high temperature cycle often referred to as "burn-in". The results of the test on a particular die, the parameters used to test that die, or the test equipment can be recorded in location 66.

Similar to the process revision indicia 62, the revisions used to sort die, and the testing of packaged product, can also be recorded in location 68. If the die contains programmable elements, then those elements may either be programmed by the manufacturer or by the customer in the field. The particular software program used to program those elements can be recorded at location 70.

Depending on the application in which integrated circuit is slated, the integrated circuit can operate at various speeds and still prove suitable for that application. For example, a microprocessor must operate at speeds exceeding 200 MHz for some applications, but would prove suitable operating less than 200 MHz in other applications. Accordingly, most manufacturers sort the packaged product according to speed grades or "bins". The particular bin at which a particular packaged die operates can be recorded in location 72.

Location 54 illustrates but one example of various product engineering bits which can be recorded into each and every die produced, tested, and shipped to a customer. The various PE bits shown are only examples of numerous types of information useful in telling the integrated circuit manufacturer possibly why an integrated circuit has failed. Of course, there may be numerous other helpful benefits in tracing unique manufacturing, testing, and programming indicia to each and every die, an outcome of which is achieved hereof.

Figure 4:
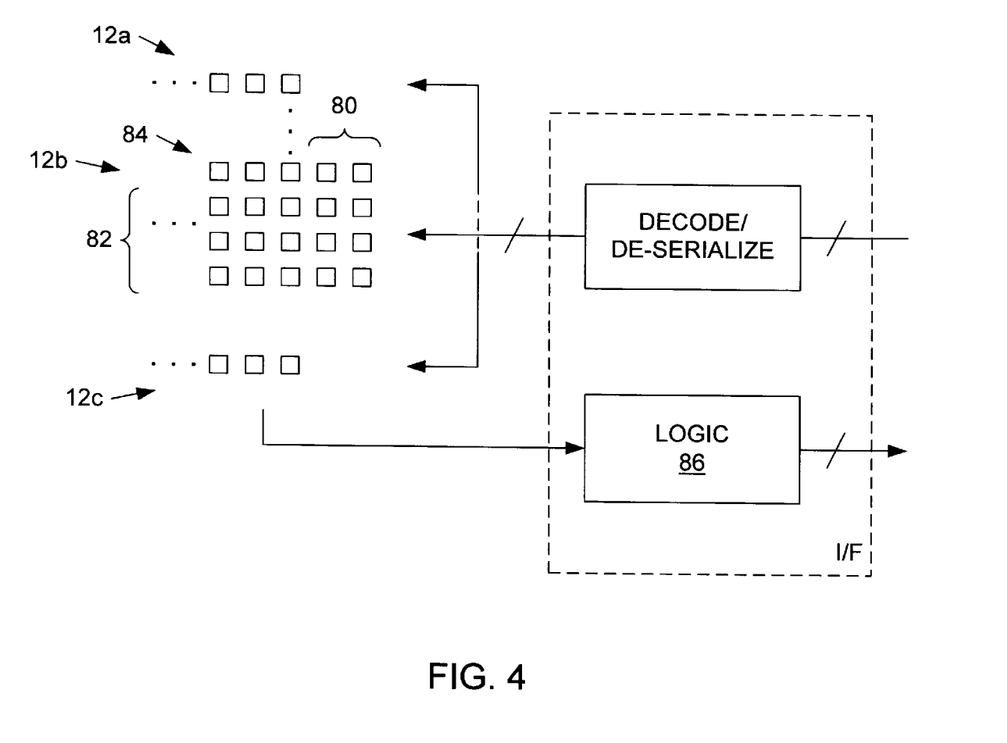
FIG. 4 is a plan view of an interface unit and storage devices adapted to receive the product engineering bits in separate locations across a die, or at a single location having redundant word lines or bit lines designed to correct defective product engineering bits.

FIG. 4 illustrates various mechanisms used to implement redundancy. Redundancy is achieved either by implementing additional storage locations 12a and 12c to storage locations 12b, or by adding additional bits or words to a single storage location 12b. Redundancy in terms of added error correction bits 80 or error correction words 82 proves beneficial when comparing those bits or words to PE bits 84 read from storage location 12b. The combination of the read PE bits and the error correction bits are combined by logic 86 within the interface unit. Logic 86 may comprise a decoder which, according to more sophisticated error correction techniques, may include block decoding or convolutional decoding algorithms. Well-known block decoding techniques, such as Reed-Solomon decoders may be used, or a combination of Reed-Solomon outer decoder with a convolutional (Viturbi) inner-decoder may used. Block decoders, convolutional decoders, or the combination of both, can be implemented as logic 86 to achieve rather extensive error detection and correction using minimal additional error correction bits 80 or error correction words 82. Regardless of the error correction technique employed, error correction can be achieved using a first set of bit locations (i.e., locations for PE bits) and a second set of bit locations (i.e., locations for error correction bits 80 and locations for error correction bits within error correction words 82). Values read from the first and second bit locations not only detect corrupted values stored in various bit locations but can correct erroneous values read from those locations.

It is necessary to use redundancy to detect and correct errors in the read PE bits since testing of the PE bits is not a viable option. In many instances, PE bits stored during SORT 1 or SORT 2 testing operations are damaged during a backgrinding operation performed on the backside surface of a wafer prior to die being extracted and assembled into an encapsulated package. Additionally, packaging die itself may cause charge gain or charge loss of previously programmed PE bit locations. Those locations cannot be tested since to do so would wipe out the unique bit values stored therein. The only viable solution is to add redundancy to those PE bits either through separate (spaced) storage locations or through error correction bits/words added to a single storage locations.

Figure 5:
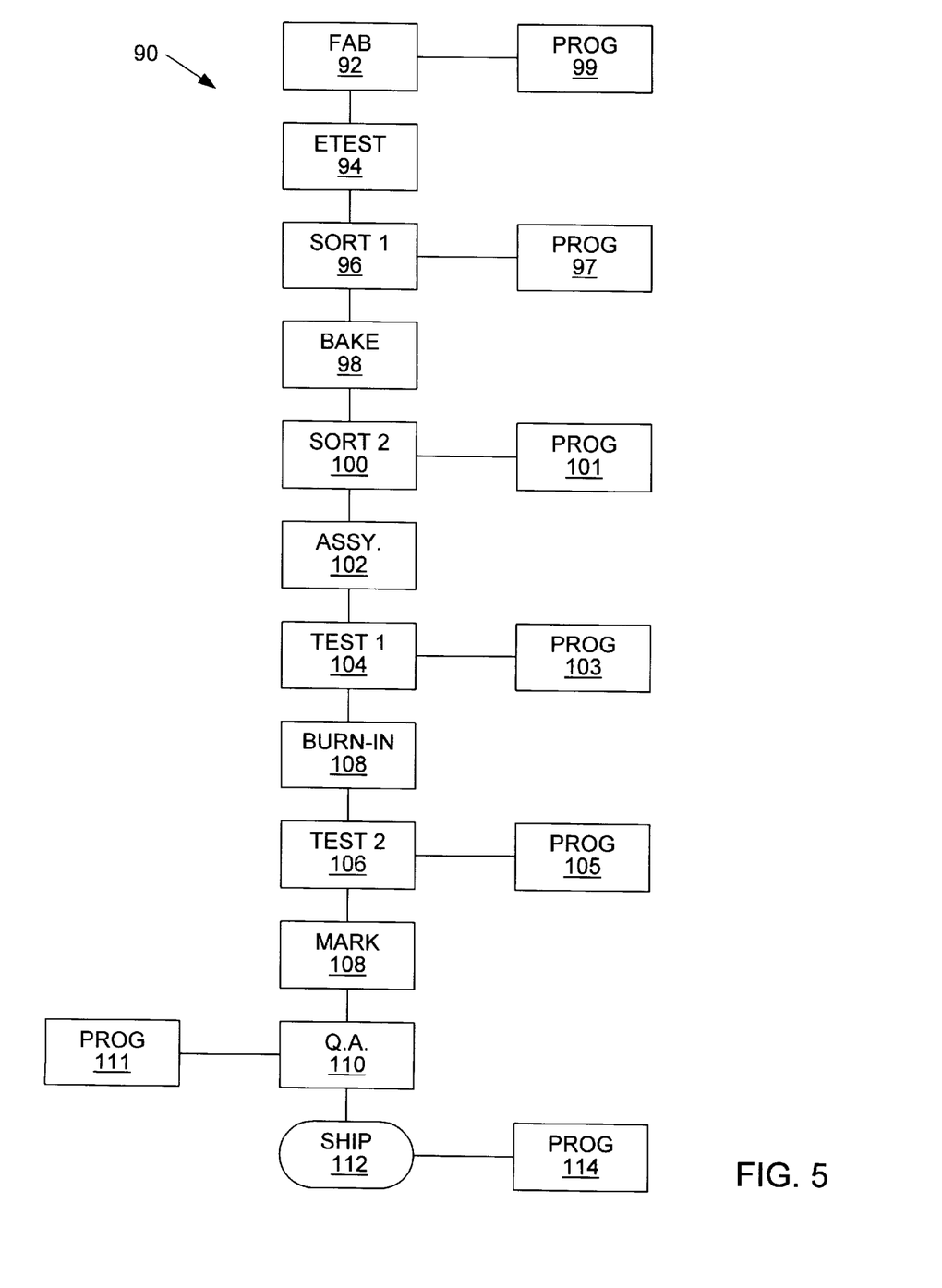
FIG. 5 is flow diagram of operations used to produce, test and assemble die prior to shipment to a customer, wherein the product engineering bits can be electrically written and read during many of the operations either before or after shipment.

FIG. 5 illustrates a processing flow 90 undertaken by a manufacturer of an integrated circuit. Flow 90 begins by fabricating a wafer 92 containing a plurality of die. Engineering test 94 can be conducted on test devices at select locations across one or more wafers within a wafer lot. Providing the engineering test 94 roughly indicates positive results, then each die of every wafer can then be tested 96 at SORT 1. SORT 1 can include parametric and functional testing, as well as visual inspection. Electrical testing includes probing the bond pads of each die to ascertain whether that die meets a limited number of performance points. As shown in FIG. 5, indicia as to those performance points for the test used at SORT 1 can be programmed at 97 into a select location of the PE bits. Similarly, the various recipe or processing tools can be programmed at step 99 into the PE bit locations during the fabrication operation 92. Programming the storage locations requires accessing subset 54 of the entire address space 50 (shown in FIG. 3). Once the non-volatile memory elements are programmed, then each wafer may be subjected to a high thermal cycle, generally referred to as the bake cycle 98. Each die can thereafter be subjected to another sort task 100, referred to as SORT 2. SORT 2 may contain many tests which are substantially identical to those used at SORT 1. The parameters used at SORT 2, or the results of SORT 2, can be programmed 101 into the PE bits as shown. All die which fail SORT1 test 96 or SORT 2 test 100 are marked with a visually-identifiable marking such as an ink dot. Die which are electrically and visibly viable are then passed to an assembly operation 102.

Assembly 102 involves placing die which pass probe tests (SORT 1 and SORT 2) into a package and then sealing that package using various well-known techniques. Connection between the bond pads upon the viable die to leads extending from the package occur during assembly operation 102.

Testing the assembled product may involve testing at various temperatures. For example, TEST 1 procedure 104 may be performed at cold temperatures, and TEST 2 procedure 106 may involve testing at hot temperatures. The temperatures used at test operations 104 and 106 can vary depending upon manufacturer specifications/or customer demands. Alternatively, test procedures 104 and 106 can occur at room temperatures, with a burn-in (high temperature) 108 occurring therebetween. Both test procedures 104 and 106 may be recorded at program steps 103 and 105, respectively. The programmed PE bits may record results from each test and the skew between tests pertinent to a unique die can be monitored. The importance in providing specific details of how, when and where a die arises, the test parameters and results from those tests can be mimicked after assembly to correlate test parameters back to that die at both high and low temperatures.

As but only one example, test skews may occur depending on where a die is manufactured relative the radial edges or center of a wafer. If, for example, contaminants predominantly occur near the edge of a wafer possibly due to accumulation upon the processing chamber wall, then those contaminants may only surface if tests are performed at elevated temperatures. TEST 2 procedure 106 and programming the results of that procedure 105 and correlating where that die is processed within a wafer, as recorded by program 99, proves beneficial in identifying the chamber wall as the cause for yield or reliability problems.

Once the assembled die is tested, the packaged product can then be marked with customer and/or vendor identification at step 108. Thereafter, the packaged product can be finally tested at a quality assurance step 110. Qualification test 110 may involve an additional reading or programming of PE bit locations at step 111. That which passes the qualification test 110 can then be shipped to a customer at step 112. Should the customer have problems, or if the manufacturer periodically requests in-field testing, the in-field tester, and results obtained from that tester, can be programmed and correlated at step 114.

Each program step shown in FIG. 5 can also be considered a read step. That is, programming the PE bit locations can occur at various manufacturing or test operations, and the results of those manufacturing or test operations can be read and correlated to a particular die at various stages in the manufacturing/testing sequence. For example, the integrated circuit may involve a programmable device such as a programmable logic device ("PLD"). The PLD is typically programmed by the customer possibly on the board in which the integrated circuit is mounted. The hardware and/or software used to program the PLD can be recorded in the field at step 114. If a failure arises, the manufacturer can correlate the recorded PE bits resulting from PLD program to the various manufacturing and test PE bits recorded at steps 97, 99, 101, 103, 105 and 111. Correlating the vintage of hardware and software used to program the PLD to the particular die being manufactured and the parameters at which that die was manufactured and tested proves beneficial in troubleshooting why the die may not perform according to its specification.

It will be appreciated to those skilled in the art having the benefit of this disclosure that this invention is believed applicable to any integrated circuit which can embody non-volatile programmable storage locations. It is understood that the form of the invention shown is to be taken as exemplary, presently preferred embodiments. Regardless of how the integrated circuit is processed, or tested, or assembled, the present invention is suited for identifying, processing, testing or programming indicia within each die unique from indicia in other die before and after leaving the manufacturer's site. Accordingly, the specification and drawings are to be regarded in an illustrative rather than a restrictive sense as to possibly numerous variations which fall within the spirit and scope of the present invention.

What is claimed is:

1. An integrated circuit comprising:
   at least three non-volatile storage locations spaced from each other across at least a portion of the integrated circuit, wherein each of said storage locations is adapted to receive identical information unique to tracing the integrated circuit to a plurality of parameters associated with manufacturing and testing the integrated circuit, and wherein each of said storage locations has a separate address within a first address space inaccessible during normal operation of the integrated circuit; and
   a circuit adapted to indicate correct information read from said storage locations when the identical information is read from a majority of said storage locations.

2. The integrated circuit as recited in claim 1, wherein said information is programmed during manufacture of the integrated circuit, and wherein the programmed information is electrically read during test of the integrated circuit to determine one of said parameters associated with manufacturing the integrated circuit.

3. The integrated circuit as recited in claim 1, wherein said information is programmed during a first test of the integrated circuit, and wherein the programmed information is electrically read during a second test subsequent to the first test to determine one of said parameters under which the integrated circuit was tested during the first test to determine the extent of test result skewing between the first and second test.

4. The integrated circuit as recited in claim 1, wherein each of said storage locations is adapted to receive information unique to tracing the integrated circuit to a plurality of parameters associated with programming the integrated circuit.

5. A storage location formed upon an integrated circuit, said storage location comprising:
   a first set of bit locations adapted to store information associated with the manufacture and test of the integrated circuit; and
   a second set of bit locations adapted to store a plurality of bits sufficient to determine corruption of said first set of bit locations, wherein said first and second sets of bit locations are inaccessible during normal operation of the integrated circuit.

6. The storage location as recited in claim 5, wherein said second set of bit locations is adapted to detect and correct digital values read from said first set of bit locations.

7. The storage location as recited in claim 5, wherein said information is programmed during manufacture of the integrated circuit, and wherein the programmed information is electrically read during test of the integrated circuit to trace the integrated circuit to a particular manufacturing process.

8. The storage device as recited in claim 5, wherein said information is programmed during a first test of the integrated circuit, and wherein the programmed information is electrically read during a second test subsequent to the first test to determine the extent of test result skewing between the first and second test.

9. The storage device as recited in claim 5, wherein said first set of bit locations is further adapted to receive information for tracing the integrated circuit to a plurality of parameters associated with programming the integrated circuit.

10. A method for attributing parameters associated with manufacture and/or test of an integrated circuit to that integrated circuit, comprising:

programming identical information corresponding to said parameters unique to the integrated circuit into each of at least three storage locations spaced from each other across at least a portion of the integrated circuit, wherein the storage locations are inaccessible during normal operation of the integrated circuit;

reading the information from each of said storage locations at a time subsequent to said programming; and comparing the information read from each of said storage locations, wherein the parameters are properly associated with manufacture and test of said integrated circuit if a match occurs between information read from at least a majority of the storage locations.

11. The method as recited in claim 10, further comprising fabricating a structure on said integrated circuit or testing the integrated circuit, wherein said programming is performed before, during or after said fabricating or said testing.

12. The method as recited in claim 10, wherein said programming comprises writing to a memory array comprising the storage locations.

13. The method as recited in claim 10, further comprising testing or operating the integrated circuit, wherein said reading occurs during said testing or operating.

14. A method for attributing parameters associated with manufacture and test of an integrated circuit to that integrated circuit, comprising:

programming a first set of bit locations with digital representations of said parameters while programming a second set of bit locations with error correction bits, wherein the first and second sets of bit locations are inaccessible during normal operation of the integrated circuit; and subsequent to said programming, reading the programmed parameters and the programmed error correction bits, whereby said error correction bits are adapted to detect and correct erroneous programmed parameters.

15. The method as recited in claim 14, further comprising fabricating a structure on said integrated circuit or testing the integrated circuit, wherein said programming is performed before, during or after said fabricating or said testing.

16. The method as recited in claim 14, further comprising reading the programmed error correction bits to detect and correct erroneous programmed parameters.

* * * * *